(12) United States Patent
Tanaka

(10) Patent No.: US 6,817,186 B2
(45) Date of Patent: Nov. 16, 2004

(54) OPERATION CONTROL APPARATUS AND OPERATION CONTROL METHOD FOR SINGLE-SHAFT COMBINED PLANT

(75) Inventor: Satoshi Tanaka, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 53 days.

(21) Appl. No.: 10/418,108

(22) Filed: Apr. 18, 2003

(65) Prior Publication Data

US 2004/0055272 A1 Mar. 25, 2004

(30) Foreign Application Priority Data

Sep. 19, 2002 (JP) ........................................ 2002-272777

(51) Int. Cl.[7] ................................................ F02C 9/54
(52) U.S. Cl. ........................ 60/773; 60/39.27; 60/39.182
(58) Field of Search ..................... 60/772, 773, 39.182, 60/39.24, 39.25, 39.27

(56) References Cited

U.S. PATENT DOCUMENTS

| | | | | |
|---|---|---|---|---|
| 4,044,552 A | * | 8/1977 | West ........................ | 60/39.163 |
| 4,380,146 A | * | 4/1983 | Yannone et al. .............. | 60/790 |
| 4,550,565 A | * | 11/1985 | Ozono ...................... | 60/39.182 |
| 4,793,132 A | * | 12/1988 | Okabe ...................... | 60/39.182 |
| 5,301,499 A | * | 4/1994 | Kure-Jensen et al. ......... | 60/773 |
| 6,035,629 A | * | 3/2000 | Hilgeman et al. ............ | 60/773 |
| 6,293,087 B2 | * | 9/2001 | Abe et al. ................. | 60/39.182 |
| 6,604,354 B2 | * | 8/2003 | Oto et al. ................. | 60/39.182 |
| 6,758,044 B2 | * | 7/2004 | Mannarino ................... | 60/773 |
| 6,763,664 B2 | * | 7/2004 | Aoyama ..................... | 60/773 |

FOREIGN PATENT DOCUMENTS

JP        2002-38907        2/2002

* cited by examiner

*Primary Examiner*—Ehud Gartenberg
(74) *Attorney, Agent, or Firm*—Oblon, Spivak, McClelland, Maier & Neustadt, P.C.

(57) ABSTRACT

An operation control apparatus and an operation control method for a single-shaft combined plant are provided. A clutch is engaged and disengaged, whereby a gas turbine (power generator) is connected to and disconnected from a steam turbine. The opening of IGV is controlled by an opening command, the opening of a burner bypass valve is controlled by another opening command, and the openings of fuel flow control valves are controlled by other opening commands found based on a pilot ratio. The commands to the IGV and the burner bypass valve and the pilot ratio are found during an isolated operation in which only the gas turbine is operated, during a joint operation in which the gas turbine and the steam turbine are both operated, during a transition from the isolated operation to the joint operation, and during a transition from the joint operation to the isolated operation. Thus, the pilot ratio and the fuel-air ratio of the gas turbine are optimized according to the state of operation, so that whether the clutch is disengaged or engaged, the combustion state of the gas turbine is stabilized.

2 Claims, 4 Drawing Sheets

OPERATION CONTROL APPARATUS AND OPERATION CONTROL METHOD FOR SINGLE-SHAFT COMBINED PLANT

The entire disclosure of Japanese Patent Application No. 2002-272777 filed on Sep. 19, 2002 including specification, claims, drawings and summary is incorporated herein by reference in its entirety.

BACKGROUND OF THE INVENTION

1. Field of the Invention

This invention relates to an operation control apparatus and an operation control method for a single-shaft combined plant. More specifically, the operation control apparatus and the operation control method according to the present invention are designed to be capable of optimally controlling the pilot ratio and the fuel-air ratio of a gas turbine whether a clutch is disengaged or engaged, or even in a transient period during which the clutch shifts from a disengaged state to an engaged state, or conversely from an engaged state to a disengaged state, with the result that the apparatus and the method can operate the single-shaft combined plant while keeping the combustion state of the gas turbine stable.

2. Description of Related Art

A single-shaft combined plant, having a gas turbine and a steam turbine connected by a single shaft, is a plant with a high efficiency, involving minimal emission of hazardous substances ($NO_x$, etc.), and flexibly accommodating diurnal changes in electric power consumption. Recently, demand has grown for a further decrease in the construction cost for this single-shaft combined plant. The conventional single-shaft combined plant involved the following factors behind cost increases:

(i) Since the gas turbine and the steam turbine are simultaneously started, there is need for a thyristor (starter) capable of generating a huge starting torque.

(ii) Since the steam turbine also rotates, together with the gas turbine, at the time of starting, cooling steam needs to be supplied to the steam turbine so that the blades of the steam turbine do not thermally expand because of windage loss. However, before a power generator output by the gas turbine increases, an exhaust gas boiler, which produces steam from an exhaust gas from the gas turbine, cannot form steam that can be charged into the steam turbine. Thus, until the exhaust gas boiler forms steam which can be charged into the steam turbine, there arises the necessity for an auxiliary boiler with a very high capacity enough to supply adequate cooling steam to the steam turbine.

(iii) In the single-shaft combined plant, the gas turbine, the steam turbine and a power generator need to be arranged in a line. Thus, a condenser has to be installed below the steam turbine, while the gas turbine, the steam turbine and the power generator should be installed at a high position (at a height as high as the third floor of a building).

To reduce the construction cost, a proposal has now been made for a single-shaft combined plant equipped with a clutch, as shown in FIG. 3 (see, for example, Japanese Unexamined Patent Publication No. 2002-38907). In FIG. 3, a gas turbine 1 and a steam turbine 2 are connected by a single shaft 3, and a power generator 4 is also connected to the shaft 3. A clutch 5 is interposed between the gas turbine 1/power generator 4 and the steam turbine 2. The clutch 5 enables the gas turbine 1 and the steam turbine 2 to be connected to and disconnected from each other.

With this single-shaft combined plant having the clutch 5 on the shaft 3, only the gas turbine 1 and the power generator 4 are started, with the gas turbine 1 and the steam turbine 2 being disconnected from each other by the clutch 5. When the gas turbine 1 reaches a rated rotational speed, the power generator 4 is connected to a power system. After connection of the power generator 4 to the power system, steam, which is generated by an exhaust gas boiler 6 with the use of exhaust gas from the gas turbine 1, is supplied to the steam turbine 2 at a time when the steam becomes suppliable to the steam turbine 2, thereby starting the steam turbine 2. After the steam turbine 2 reaches a rated rotational speed, the clutch 5 is engaged to convey the torque of the steam turbine 2 to the power generator 4.

The single-shaft combined plant equipped with the clutch 5 are started and stopped in the manners illustrated in FIG. 4. In FIG. 4, solid lines represent a target load and an actual load, dashed lines represent gas turbine outputs, and one-dot chain lines represent steam turbine outputs.

As shown in FIG. 4, during a period from $t_1$ to $t_2$ within a start period, the actual load is only the gas turbine output. The target load and the actual load are increased according to a change rate.

At a time $t_2$ within the start period, the clutch 5 is engaged. In a period from $t_2$ to $t_3$, the actual load increases in accordance with an increase in the steam turbine output.

After a time $t_3$ within the start period, the actual load is the sum of the gas turbine output and the steam turbine output. The target load and the actual load are increased according to the change rate.

Until a time $t_{10}$ within a stop period, the actual load is the sum of the gas turbine output and the steam turbine output. The target load and the actual load are decreased according to the change rate.

At the time $t_{10}$ within the stop period, a steam flow control valve $V_4$ (see FIG. 3) for the steam turbine 2 starts to be closed. At a time $t_{11}$ within the stop period, the clutch 5 is disengaged.

After a time $t_{12}$ within the stop period, the actual load is only the gas turbine output. The target load and the actual load are decreased according to the change rate.

The single-shaft combined plant equipped with the clutch 5, as shown in FIG. 3, has the following advantages:

(I) Only the gas turbine 1 and the power generator 4 are started first, so that the capacity of a thyristor necessary for starting can be decreased (the capacity can be decreased in an amount corresponding to the weight of the steam turbine 2).

(II) During a period for which only the gas turbine 1 and the power generator 4 are operated, the steam turbine 2 rotates at a low speed, requiring no cooling steam. Thus, the capacity of the auxiliary boiler can be decreased.

(III) The thermal expansion of the steam turbine 2 can be accommodated by the clutch 5. Thus, the gas turbine 1, the power generator 4 and the steam turbine 2 are arranged in this order, namely, the steam turbine 2 is arranged at the end, whereby an axial flow exhaust condenser can be used. By so doing, the shaft 3 can be installed at a lower position than before.

As shown in FIG. 3, the gas turbine 1 is composed of a compressor C, a burner B and a turbine T as main members. IGV (inlet guide vane) 7 is disposed at the entrance of the compressor C, and the opening of the IGV 7 is controlled by an IGV opening controller 8.

A main fuel nozzle of the burner B is supplied with fuel at a flow rate controlled by a main fuel flow control valve $V_1$, and a pilot fuel nozzle of the burner B is supplied with fuel at a flow rate controlled by defined by "pilot fuel flow rate/main fuel flow rate".

A bypass pipe 9 is connected in parallel with the burner B, and the ratio between the amount of compressed air flowing into the burner B and the amount of compressed air flowing into the bypass pipe 9 varies with the opening of a burner bypass valve $V_3$. That is, as the opening of the burner bypass valve $V_3$ decreases, the amount of air flowing into the burner B increases and the amount of air flowing into the bypass pipe 9 decreases. As the opening of the burner bypass valve $V_3$ increases, the amount of air flowing into the burner B decreases and the amount of air flowing into the bypass pipe 9 increases.

The amount of steam supplied from the exhaust gas boiler 6 to the steam turbine 2 is controlled by a steam flow control valve $V_4$.

With the shingle-shaft combined plant equipped with the clutch, however, problems to be discussed below arise when the clutch 5 is engaged and when the clutch 5 is disengaged. These problems will be explained in sequence.

In the gas turbine 1, an optimal pilot ratio and an optimal fuel-air ratio (commands for the openings of IGV and the burner bypass valve) need to be calculated in response to the state of combustion within the burner B.

Thermal energy obtained by combustion is converted by the turbine T into kinetic energy, which in turn is converted into electric energy by the power generator 4. Thus, a power generator output $W_1$, the outcome of the energy obtained by combustion, is close to the combustion state, and is responsive with minimal delay to a change in the combustion state. Conventionally, therefore, the power generator output $W_1$ was used to calculate the pilot ratio and calculate commands for the openings of the IGV 7 and the burner bypass valve $V_3$ (details of the calculation methods will be described later). Functions for calculating the optimal pilot ratio, the optimal burner bypass valve opening command, and the optimal IGV opening command from the power generator output are adjusted in situ by an experienced technician watching the combustion state.

In the gas turbine 1, when output is to be increased, fuel is increased prior to combustion, and when output is to be decreased, fuel is reduced prior to combustion. CSO, a command for the flow rate of fuel for this purpose, serves as a base on which the pilot ratio is calculated. Since CSO is calculated based on the target power generator output and the actual power generator output, it may be said that CSO is calculated on a power generator output basis.

With the single-shaft combined plant (a plant having a gas turbine 1 and a steam turbine 2 connected by a single shaft 3), the power generator output is the sum of the gas turbine output and the steam turbine output, and it is impossible to measure the gas turbine output alone. Thus, the steam turbine output is calculated based on the pressure of steam flowing into the steam turbine 2, and the output corresponding to the steam turbine is subtracted from the output of the entire power generator to calculate an output corresponding to the gas turbine. The fuel-air ratio is calculated from the results of the calculation.

The conventional method of calculation for determining the optimal pilot ratio and the optimal fuel-air ratio in the single-shaft combined plant, and control actions using the calculated pilot ratio and fuel-air ratio will be described with reference to FIG. 3.

(1) Find the steam pressure $P_S$ of steam flowing into the steam turbine 2.

(2) Using a conversion function Fx1 for converting the steam pressure into a steam turbine output (MW) find a steam turbine output $W_S$ from the steam pressure $P_S$.

(3) Using a deviation computing facility 10, subtract the steam turbine output $W_S$ from a power generator output $W_1$ to obtain a gas turbine output $W_G$.

(4) Using a function Fx2 for obtaining an optimal IGV opening command from the gas turbine output, find an IGV opening command a responsive to the gas turbine output $W_G$. Based on this IGV opening command α, the IGV opening controller 8 exercises opening control of the IGV7.

(5) Using a function Fx3 for obtaining an optimal burner bypass valve opening command from the gas turbine output, find a burner bypass valve opening command β suitable for the gas turbine output $W_G$. Based on this burner bypass valve opening command β, exercise opening control of the burner bypass valve $V_3$.

(6) Using a deviation computing facility 11, subtract the power generator output $W_1$ from a target power generator output $W_0$ to obtain a power generator output deviation $W_0$–$W_1$. Subject this power generator output deviation $W_0$–$W_1$ to PI (proportional.integral) computation by a PI computing facility 12, and further limit the upper limit value of the result by a limiting facility 13 to obtain a fuel flow rate command CSO. Since the upper limit value is limited by the limiting facility 13, the gas turbine 1 can be protected from excess combustion.

(7) Using a function Fx4 for obtaining a pilot ratio based on a fuel flow rate command, find a pilot ratio ε appropriate to the fuel flow rate command CSO.

(8) Using a multiplying facility 14, multiply the fuel flow rate command CSO by the pilot ratio ε to find a pilot fuel flow control valve opening command γ. Based on this pilot fuel flow control valve opening command γ, exercise opening control of the pilot fuel flow control valve $V_2$.

(9) Using a deviation computing facility 15, subtract the pilot fuel flow control valve opening command γ from the fuel flow rate command CSO to find a main fuel flow control valve opening command δ. Based on this main fuel flow control valve opening command δ, exercise opening control of the main fuel flow control valve $V_1$.

In accordance with the above-described calculation method (1) to (9), the steam turbine output $W_S$ is calculated based on the steam pressure $P_S$ of steam flowing into the steam turbine 2. The steam turbine output $W_S$ found may be lower or higher than the actual steam turbine output, because the clutch 5 is engaged or disengaged. As a result, a discrepancy may arise between the gas turbine output $W_G$, which has been obtained by calculation based on the steam turbine output $W_S$, and the actual gas turbine output.

Even with the conventional single-shaft combined plant using no clutch, the result of calculation of the steam turbine output (MW basis) sometimes showed a discrepancy compared with the actual output (MW basis) of the steam turbine. However, an experienced technician adjusts the Fx functions on site so that an optimal IGV opening command, an optimal burner bypass valve opening command, and an optimal pilot ratio can be obtained, provided that the result of calculation with the discrepancy is correct. Hence, even if there is a discrepancy in the calculation of the steam turbine output, no problem is posed, because an optimal IGV opening command, an optimal burner bypass valve opening command, and an optimal pilot ratio are always obtained finally.

With the single-shaft combined plant equipped with the clutch 5 as shown in FIG. 3, there are two cases, as illustrated in FIG. 4: First, the clutch 5 is disengaged to disconnect the gas turbine 1 and the steam turbine 2 and operate the gas turbine 1 alone. Secondly, the clutch 5 is engaged to connect the gas turbine 1 and the steam turbine 2 and operate both of the gas turbine 1 and the steam turbine 2 jointly. Thus, a discrepancy in the calculation of gas turbine output due to a discrepancy in the calculation of steam turbine output causes a fatal problem to the calculation of the pilot ratio and the fuel-air ratio.

For example, let it be assumed that the gas turbine 1 rotates singly, and the gas turbine output is 70 MW. Also assume another case where the gas turbine 1 rotates, with the clutch 5 in engagement, and the shaft output is calculated at 100 MW, while the steam turbine output is calculated at 30 MW, so that the gas turbine output is calculated at 70 MW. In the former and latter cases, the propulsive torque of the gas turbine 1 is not necessarily the same, and the optimal pilot ratio and the optimal fuel-air ratio become different.

In this situation, according to the conventional control method for the single-shaft combined plant (the aforementioned control method (1) to (9)), the pilot ratio and the fuel-air ratio are calculated in similar manners, whether the clutch 5 is engaged or disengaged. Consequently, it is no more possible to find functions suitable for both of a state in which the gas turbine rotates alone, and a state in which the gas turbine rotates with the clutch engaged.

SUMMARY OF THE INVENTION

The present invention has been accomplished in the light of the foregoing earlier technologies. Its object is to provide an operation control apparatus and an operation control method for a single-shaft combined plant, the operation control apparatus and the operation control method being designed such that the pilot ratio and the fuel-air ratio of a gas turbine can be calculated correctly, whether a clutch is disengaged or engaged, and that even in a transient period during which the clutch shifts from a disengaged state to an engaged state, or conversely from an engaged state to a disengaged state, the shift can be effected, with the combustion state of the gas turbine being kept stable.

According to an aspect of the present invention, there is provided an operation control apparatus for application to a single-shaft combined plant, the single-shaft combined plant comprising a gas turbine, a power generator, and a steam turbine connected together by a single shaft, and a clutch provided on the shaft for connecting the gas turbine and the power generator to the steam turbine and disconnecting the gas turbine and the power generator from the steam turbine, the steam turbine being supplied with steam from an exhaust gas boiler for generating steam by use of an exhaust gas from the gas turbine, the operation control apparatus being adapted to find an inlet guide vane opening command for controlling an opening of an inlet guide vane provided in a compressor of the gas turbine and control the opening of the inlet guide vane; to find a burner bypass valve opening command for controlling an opening of a burner bypass valve provided in a burner of the gas turbine and control the opening of the burner bypass valve; and to find a pilot ratio, a ratio between a main fuel and a pilot fuel fed to the burner, and control openings of a main fuel flow control valve and a pilot fuel flow control valve in accordance with the pilot ratio, the operation control apparatus comprising:

a computing facility unit for converting a steam pressure of steam flowing into the steam turbine into a steam turbine output; subtracting the steam turbine output from a power generator output of the power generator to find a gas turbine output; and finding a fuel flow rate command of a value corresponding to a deviation of the power generator output from a target power generator output;

a state signal generator for outputting an engaged state signal when the clutch is engaged; outputting a disengaged state signal when the clutch is disengaged; increasing a value of the engaged state signal gradually and also decreasing a value of the disengaged state signal gradually to zero in a predetermined transitional period starting at a time of engagement when the clutch in disengagement is engaged; and decreasing the value of the engaged state signal gradually to zero and also increasing the value of the disengaged state signal gradually in a predetermined transitional period starting at a time of disengagement when the clutch in engagement is disengaged;

an inlet guide vane opening command computing facility unit which has a first inlet guide vane opening command computing function capable of finding an optimal inlet guide vane opening command from the gas turbine output in an engaged state of the clutch, and a second inlet guide vane opening command computing function capable of finding an optimal inlet guide vane opening command from the gas turbine output in a disengaged state of the clutch; and which combines the inlet guide vane opening commands, found by the first and second inlet guide vane opening command computing functions, at rates corresponding to the values of the engaged state signal and the disengaged state signal to compute a final inlet guide vane opening command;

a burner bypass valve opening command computing facility unit which has a first burner bypass valve opening command computing function capable of finding an optimal burner bypass valve opening command from the gas turbine output in the engaged state of the clutch, and a second burner bypass valve opening command computing function capable of finding an optimal burner bypass valve opening command from the gas turbine output in the disengaged state of the clutch; and which combines the burner bypass valve opening commands, found by the first and second burner bypass valve opening command computing functions, at rates corresponding to the values of the engaged state signal and the disengaged state signal to compute a final burner bypass valve opening command; and a pilot ratio computing facility unit which has a first pilot ratio computing function capable of finding an optimal pilot ratio from the fuel flow rate command in the engaged state of the clutch, and a second pilot ratio computing function capable of finding an optimal pilot ratio from the fuel flow rate command in the disengaged state of the clutch; and which combines the pilot ratios, found by the first and second pilot ratio computing functions, at rates corresponding to the values of the engaged state signal and the disengaged state signal to compute a final pilot ratio.

According to another aspect of the present invention, there is provided an operation control method for application to a single-shaft combined plant, the single-shaft combined plant comprising a gas turbine, a power generator, and a steam turbine connected together by a single shaft, and a clutch provided on the shaft for connecting the gas turbine and the power generator to the steam turbine and disconnecting the gas turbine and the power generator from the steam turbine, the steam turbine being supplied with steam from an exhaust gas boiler for generating steam by use of an exhaust gas from the gas turbine, the operation control method being adapted to find an inlet guide vane opening command for controlling an opening of an inlet guide vane provided in a compressor of the gas turbine and control the opening of the inlet guide vane; to find a burner bypass valve opening command for controlling an opening of a burner bypass valve provided in a burner of the gas turbine and control the opening of the burner bypass valve; and to find a pilot ratio, a ratio between a main fuel and a pilot fuel fed to the burner, and control openings of a main fuel flow control valve and a pilot fuel flow control valve in accordance with the pilot ratio, the operation control method comprising:

converting a steam pressure of steam flowing into the steam turbine into a steam turbine output; subtracting the steam turbine output from a power generator output of the power generator to find a gas turbine output; and finding a fuel flow rate command of a value corresponding to a deviation of the power generator output from a target power generator output;

outputting an engaged state signal when the clutch is engaged; outputting a disengaged state signal when the clutch is disengaged; increasing a value of the engaged state signal gradually and also decreasing a value of the disengaged state signal gradually to zero in a predetermined transitional period starting at a time of engagement when the clutch in disengagement is engaged; and decreasing the value of the engaged state signal gradually to zero and also increasing the value of the disengaged state signal gradually in a predetermined transitional period starting at a time of disengagement when the clutch in engagement is disengaged;

using a first inlet guide vane opening command computing function capable of finding an optimal inlet guide vane opening command from the gas turbine output in an engaged state of the clutch, and a second inlet guide vane opening command computing function capable of finding an optimal inlet guide vane opening command from the gas turbine output in a disengaged state of the clutch; and combining the inlet guide vane opening commands, found by the first and second inlet guide vane opening command computing functions, at rates corresponding to the values of the engaged state signal and the disengaged state signal to produce a final inlet guide vane opening command;

using a first burner bypass valve opening command computing function capable of finding an optimal burner bypass valve opening command from the gas turbine output in the engaged state of the clutch, and a second burner bypass valve opening command computing function capable of finding an optimal burner bypass valve opening command from the gas turbine output in the disengaged state of the clutch; and combining the burner bypass valve opening commands, found by the first and second burner bypass valve opening command computing functions, at rates corresponding to the values of the engaged state signal and the disengaged state signal to produce a final burner bypass valve opening command; and using a first pilot ratio computing function capable of finding an optimal pilot ratio from the fuel flow rate command in the engaged state of the clutch, and a second pilot ratio computing function capable of finding an optimal pilot ratio from the fuel flow rate command in the disengaged state of the clutch; and combining the pilot ratios, found by the first and second pilot ratio computing functions, at rates corresponding to the values of the engaged state signal and the disengaged state signal to produce a final pilot ratio.

Because of the above features, the pilot ratio and the fuel-air ratio of the gas turbine can be calculated correctly, whether the clutch is disengaged or engaged. Even in a transient period during which the clutch shifts from a disengaged state to an engaged state, or conversely from an engaged state to a disengaged state, the shift can be effected, with the combustion state of the gas turbine being kept stable.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

A preferred embodiment of the present invention will now be described in detail with reference to the accompanying drawings, which in no way limit the invention.

Figure 1:
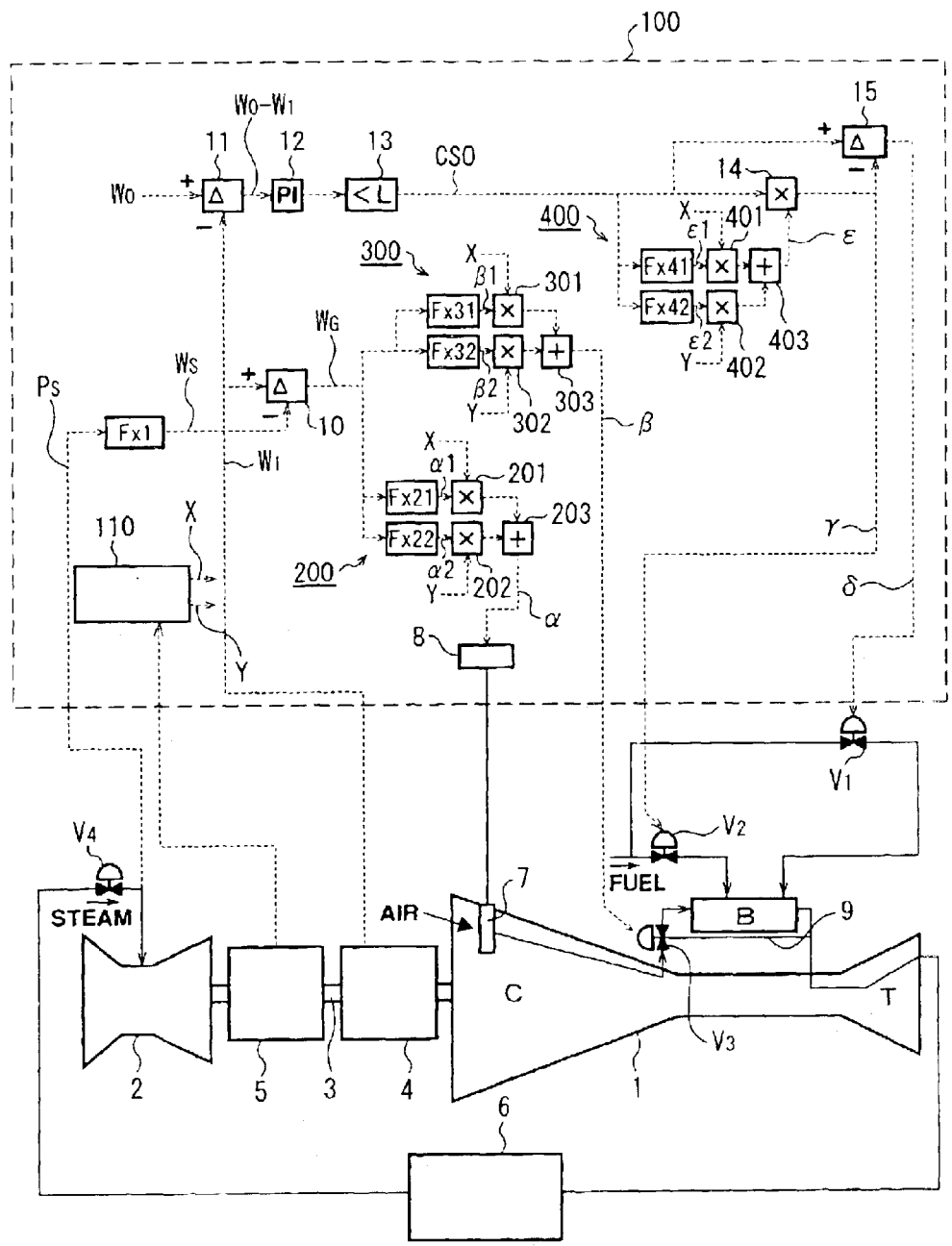
FIG. 1 is a configuration diagram showing an operation control apparatus according to an embodiment of the present invention.

FIG. 1 is a configuration diagram showing an operation control apparatus for a single-shaft combined plant to which the present invention has been applied.

As shown in FIG. 1, a gas turbine 1, a power generator 4, and a steam turbine 2 are connected by a single shaft 3. A clutch 5, by which the gas turbine 1 and the power generator 4 are connected to or disconnected from the steam turbine 2, is provided on the shaft 3. An exhaust gas boiler 6 generates steam with the use of an exhaust gas from the gas turbine 1, and supplies this steam to the steam turbine 2. Using this feature, a single-shaft combined plant equipped with the clutch is constructed. The gas turbine 1 of the single-shaft combined plant equipped with the clutch has its pilot ratio and fuel-air ratio controlled by an operation control apparatus 100.

The operation control apparatus 100 can determine an IGV opening command $\alpha$, a burner bypass valve opening command $\beta$, a pilot fuel flow control valve opening command $\gamma$, a main fuel flow control valve opening command $\delta$, and a pilot ratio $\epsilon$ which make the combustion state of the gas turbine 1 stable whether the clutch 5 is in a disengaged state (namely, when the gas turbine 1 is rotationally driven alone) or in an engaged state (namely, when the gas turbine 1 and the steam turbine 2 are both rotationally driven).

The opening of an IGV 7 provided at the entrance of a compressor C of the gas turbine 1 is controlled by an IGV opening controller 8 based on the IGV opening command $\alpha$.

The opening of a burner bypass valve $V_3$ provided at the preceding stage of a burner B of the gas turbine 1 is controlled by the burner bypass valve opening command $\beta$. The ratio between the amount of air flowing into the burner B and the amount of air flowing into a bypass pipe 9 varies according to the opening of the burner bypass valve $V_3$.

The opening of a main fuel flow control valve $V_1$, which controls the amount of fuel supplied to a main fuel nozzle of the burner B, is controlled by the main fuel flow control valve opening command $\delta$. The opening of a pilot fuel flow control valve $V_2$, which controls the amount of fuel supplied to a pilot fuel nozzle of the burner B, is controlled by the pilot fuel flow control valve opening command $\gamma$. The values of the main fuel flow control valve opening command $\delta$ and the pilot fuel flow control valve opening command $\gamma$ are determined by the pilot ratio $\epsilon$ and the fuel flow rate command CSO.

Figure 3:
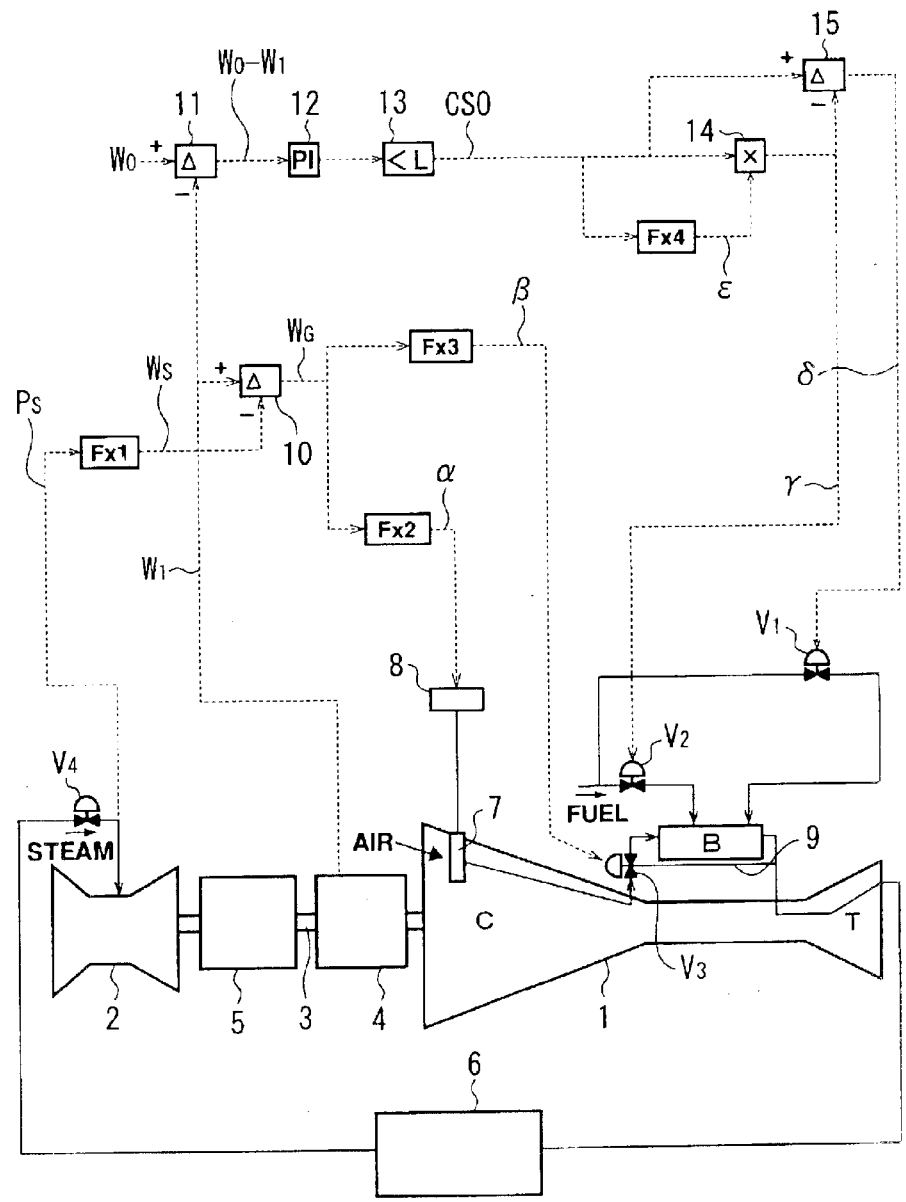
FIG. 3 is a configuration diagram showing an operation control apparatus according to an earlier technology.
Figure 4:
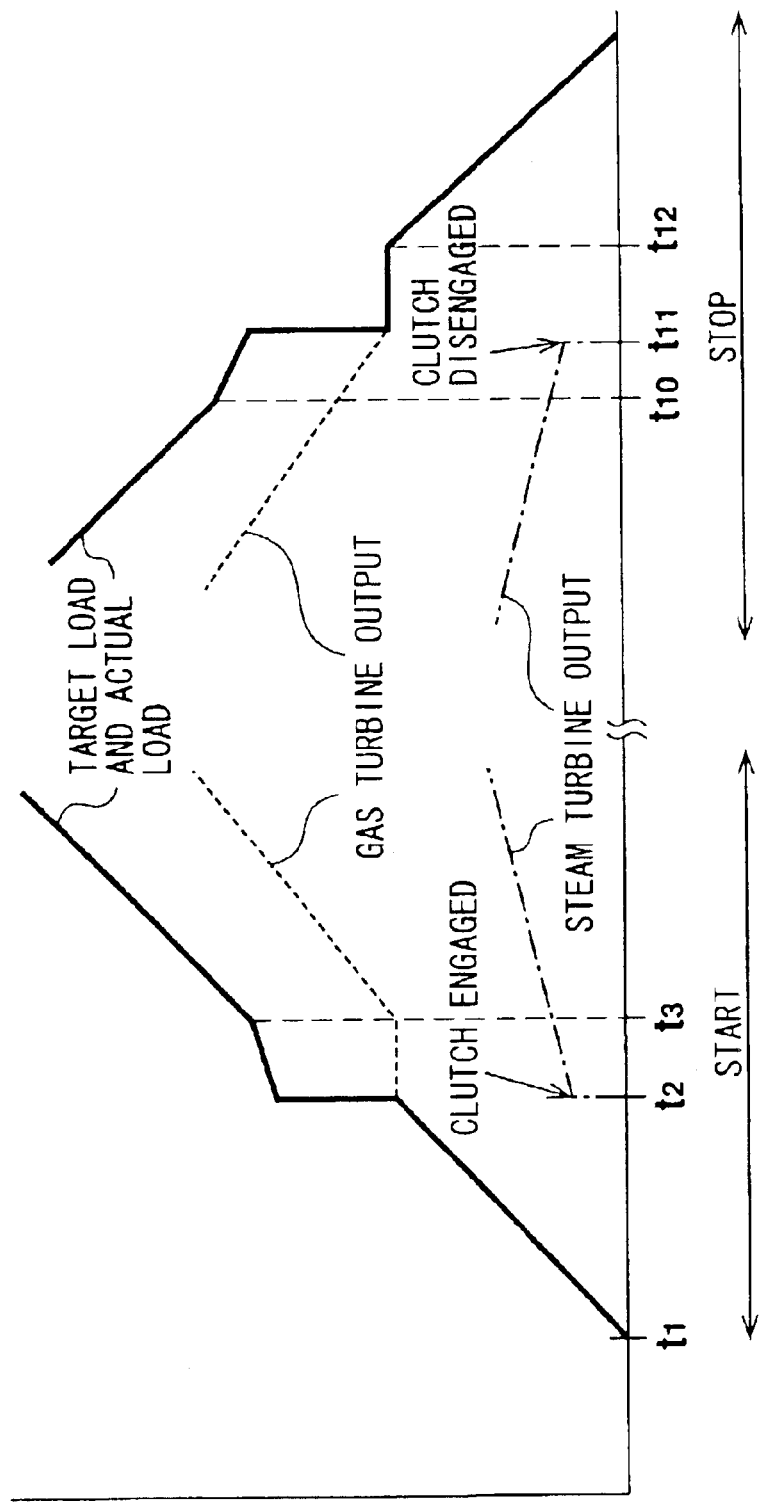
FIG. 4 is an explanation drawing showing the start and stop states of a single-shaft combined plant.

Of the computing facilities of the operation control apparatus 100, those new compared with the computing facilities of the conventional control method (the control method illustrated in FIG. 3) are a state signal generator 110, an IGV opening command computing facility 200, a burner bypass valve opening command computing facility 300, and a pilot ratio computing facility 400.

The state signal generator 110 generates an engaged state signal X and a disengaged state signal Y. The values of the engaged state signal X and the disengaged state signal Y depend on the engaged and disengaged states of the clutch 5 in the following manner:

When the disengaged clutch 5 is engaged, the value of the engaged state signal X varies gradually from 0 to 1, and the value of the disengaged state signal Y varies gradually from 1 to 0, over a predetermined transitional period (time) starting at the time of engagement. After the predetermined transitional period (time) has elapsed since the time of engagement, the value of the engaged state signal X is held at 1, while the disengaged state signal Y is held at 0. In other words, when the engagement continues, the value of the engaged state signal X after a lapse of the transitional period (time) is held at 1, and the value of the disengaged state signal Y after a lapse of the transitional period (time) is held at 0.

When the engaged clutch 5 is disengaged, the value of the engaged state signal X varies gradually from 1 to 0, and the value of the disengaged state signal Y varies gradually from 0 to 1, over a predetermined transitional period (time) starting at the time of disengagement. After the predetermined transitional period (time) has elapsed since the time of disengagement, the value of the engaged state signal X is held at 0, while the disengaged state signal Y is held at 1. In other words, when the disengagement continues, the value of the engaged state signal X after a lapse of the transitional period (time) is held at 0, and the value of the disengaged state signal Y after a lapse of the transitional period (time) is held at 1.

A concrete circuit construction example of the state signal generator 110 will be described later. The "transitional period (time)" is determined by the characteristics of the single-shaft combined plant.

The IGV opening command computing facility 200 has a function Fx21 for finding an optimal IGV opening command $\alpha_1$ from a gas turbine output $W_G$ when the clutch 5 is in an engaged state (namely, when the gas turbine 1 and the steam turbine 2 are both rotationally driven); a function Fx22 for finding an optimal IGV opening command $\alpha_2$ from the gas turbine output $W_G$ when the clutch 5 is in a disengaged state (namely, when the gas turbine 1 is rotationally driven alone); a multiplying facility 201 for multiplying the IGV opening command $\alpha_1$ and the engaged state signal X together; a multiplying facility 202 for multiplying the IGV opening command $\alpha_2$ and the disengaged state signal Y together; and an adding facility 203 for adding the IGV opening command $X \cdot \alpha_1$ and the IGV opening command $Y \cdot \alpha_2$ to find the IGV opening command $\alpha$.

The burner bypass valve opening command computing facility 300 has a function Fx31 for finding an optimal burner bypass valve opening command $\beta_1$ from the gas turbine output $W_G$ when the clutch 5 is in an engaged state (namely, when the gas turbine 1 and the steam turbine 2 are both rotationally driven); a function Fx32 for finding an optimal burner bypass valve opening command $\beta_2$ from the gas turbine output $W_G$ when the clutch 5 is in a disengaged state (namely, when the gas turbine 1 is rotationally driven alone); a multiplying facility 301 for multiplying the burner bypass valve opening command $\beta_1$ and the engaged state signal X together; a multiplying facility 302 for multiplying the burner bypass valve opening command $\beta_2$ and the disengaged state signal Y together; and an adding facility 303 for adding the burner bypass valve opening command $X \cdot \beta_1$ and the burner bypass valve opening command $Y \cdot \beta_2$ to find the burner bypass valve opening command $\beta$.

The pilot ratio computing facility 400 has a function Fx41 for finding an optimal pilot ratio $\epsilon_1$ from the fuel flow rate command CSO when the clutch 5 is in an engaged state (namely, when the gas turbine 1 and the steam turbine 2 are both rotationally driven); a function Fx42 for finding an optimal pilot ratio $\epsilon_2$ from the fuel flow rate command CSO when the clutch 5 is in a disengaged state (namely, when the gas turbine 1 is rotationally driven alone); a multiplying facility 401 for multiplying the pilot ratio $\epsilon_1$ and the engaged state signal X together; a multiplying facility 402 for multiplying the pilot ratio $\epsilon_2$ and the disengaged state signal Y together; and an adding facility 403 for adding the pilot ratio $X \cdot \epsilon_1$ and the pilot ratio $Y \cdot \epsilon_2$ to find the pilot ratio $\epsilon$.

Next, the control state of the entire operation control apparatus 100 will be described. First, a steam pressure $P_S$ of steam flowing into the steam turbine 2 is found. Using a conversion function Fx1 for converting the steam pressure into a steam turbine output (MW), a steam turbine output $W_S$ is found from the steam pressure $P_S$. Further, by use of a deviation computing facility 10, the steam turbine output $W_S$ is subtracted from a power generator output $W_1$ to obtain a gas turbine output $W_G$.

By applying the gas turbine output $W_G$ to the IGV opening command computing facility 200, an IGV opening command $\alpha$ (=$X \cdot \alpha_1 + Y \cdot \alpha_2$) is obtained.

When the clutch 5 is engaged, X=1 and Y=0, so that $\alpha = \alpha_1$. In this manner, it is possible to find the IGV opening command $\alpha$ (=$\alpha_1$) of the optimal value from the gas turbine output $W_G$, with the clutch 5 in engagement. When the clutch 5 is disengaged, on the other hand, X=0 and Y=1, so that $\alpha = \alpha_2$. In this manner, it is possible to find the IGV opening command $\alpha$ (=$\alpha_2$) of the optimal value from the gas turbine output $W_G$, with the clutch 5 in disengagement.

When the disengaged clutch 5 shifts to an engaged state, X gradually changes like 0→1, and Y gradually changes like 1→0. Thus, the IGV opening command $\alpha$ (=$X \cdot \alpha_1 + Y \cdot \alpha_2$) gradually shifts from the optimal value in the disengaged state to the optimal value in the engaged state. When the engaged clutch 5 shifts to a disengaged state, X gradually changes like 1→0, and Y gradually changes like 0→1. Thus, the IGV opening command $\alpha$ (=$X \cdot \alpha_1 + Y \cdot \alpha_2$) gradually shifts from the optimal value in the engaged state to the optimal value in the disengaged state.

Hence, whether the clutch 5 is disengaged or engaged, and further in a period of transition from engagement to disengagement or from disengagement to engagement, the opening control of the IGV 7 by the IGV opening command $\alpha$ (=$X \cdot \alpha_1 + Y \cdot \alpha_2$) can become optimal opening control. It is particularly noted that in a period of transition from engagement to disengagement or from disengagement to engagement, the IGV opening command α changes smoothly according to the state. Thus, gentle switching control can be exercised without occurrence of combustion oscillations.

By applying the gas turbine output $W_G$ to the burner bypass valve opening command computing facility 300, a burner bypass valve opening command β ($=X\cdot\beta_1+Y\cdot\beta_2$) is obtained.

When the clutch 5 is engaged, X=1 and Y=0, so that β=$\beta_1$. In this manner, it is possible to find the burner bypass valve opening command β ($=\beta_1$) of the optimal value from the gas turbine output $W_G$, with the clutch 5 in engagement. When the clutch 5 is disengaged, on the other hand, X=0 and Y=1, so that β=$\beta_2$. In this manner, it is possible to find the burner bypass valve opening command β ($=\beta_2$) of the optimal value from the gas turbine output $W_G$, with the clutch 5 in disengagement.

When the disengaged clutch 5 shifts to an engaged state, X gradually changes like 0→1, and Y gradually changes like 1→0. Thus, the burner bypass valve opening command β ($=X\cdot\beta_1+Y\cdot\beta_2$) gradually shifts from the optimal value in the disengaged state to the optimal value in the engaged state. When the engaged clutch 5 shifts to a disengaged state, X gradually changes like 1→0, and Y gradually changes like 0→1. Thus, the burner bypass valve opening command β ($=X\cdot\beta_1+Y\cdot\beta_2$) gradually shifts from the optimal value in the engaged state to the optimal value in the disengaged state.

Hence, whether the clutch 5 is disengaged or engaged, and further in a period of transition from engagement to disengagement or from disengagement to engagement, the opening control of the burner bypass valve $V_3$ by the burner bypass valve opening command β ($=X\cdot\beta_1+Y\cdot\beta_2$) can become optimal opening control. It is particularly noted that in a period of transition from engagement to disengagement or from disengagement to engagement, the burner bypass valve opening command β changes smoothly according to the state. Thus, gentle switching control can be exercised without occurrence of combustion oscillations.

Besides, with the use of a deviation computing facility 11, a power generator output $W_1$ is subtracted from a target power generator output $W_0$ to obtain a power generator output deviation $W_0$–$W_1$. This power generator output deviation $W_0$–$W_1$ is subjected to PI computation by a PI (proportional·integral) computing facility 12, and the upper limit value of the result is further limited by a limiting facility 13 to obtain a fuel flow rate command CSO. Since the upper limit value is limited by the limiting facility 13, the gas turbine 1 can be protected from excess combustion.

By applying the fuel flow rate command CSO to the pilot ratio computing facility 400, a pilot ratio ε ($=X\cdot\epsilon_1+Y\cdot\epsilon_2$) is obtained.

When the clutch 5 is engaged, X=1 and Y=0, so that ε=$\epsilon_1$. In this manner, it is possible to find the pilot ratio ε ($=\epsilon_1$) of the optimal value from the fuel flow rate command CSO, with the clutch 5 in engagement. When the clutch 5 is disengaged, on the other hand, X=0 and Y=1, so that ε=$\epsilon_2$. In this manner, it is possible to find the pilot ratio ε ($=\epsilon_2$) of the optimal value from the fuel flow rate command CSO, with the clutch 5 in disengagement.

When the disengaged clutch 5 shifts to an engaged state, X gradually changes like 0→1, and Y gradually changes like 1→0. Thus, the pilot ratio ε ($=X\cdot\epsilon_1+Y\cdot\epsilon_2$) gradually shifts from the optimal value in the disengaged state to the optimal value in the engaged state. When the engaged clutch 5 shifts to a disengaged state, X gradually changes like 1→0, and Y gradually changes like 0→1. Thus, the pilot ratio ε ($=X\cdot\epsilon_1+Y\cdot\epsilon_2$) gradually shifts from the optimal value in the engaged state to the optimal value in the disengaged state.

Hence, whether the clutch 5 is disengaged or engaged, and further in a period of transition from engagement to disengagement or from disengagement to engagement, optimal opening control can be achieved by obtaining the pilot fuel flow control valve opening command γ and the main fuel flow control valve opening command δ based on the pilot ratio ε ($=X\cdot\epsilon_1+Y\cdot\epsilon_2$) and controlling the openings of the pilot fuel flow control valve $V_2$ and the main fuel flow control valve $V_1$. It is particularly noted that in a period of transition from engagement to disengagement or from disengagement to engagement, the pilot ratio ε changes smoothly according to the state. Thus, gentle switching control can be exercised without occurrence of combustion oscillations.

Consequently, whether the clutch 5 is disengaged or engaged, and further in a period of transition from engagement to disengagement or from disengagement to engagement, the pilot ratio ε (accordingly, the fuel flow control valve opening commands γ, δ) and the fuel-air ratio (IGV opening command α, burner bypass valve opening command β) of the gas turbine 1 can take optimal values, so that the gas turbine 1 can be operated in the optimal state. Furthermore, in a period of transition from engagement to disengagement or from disengagement to engagement, switching can be performed gently without generating combustion oscillations of the gas turbine 1.

The control system of the present embodiment adjusts the functions Fx21, Fx22, Fx31, Fx32, Fx41 and Fx42 for finding the optimal pilot ratio and the optimal fuel-air ratio while operating the gas turbine 1 alone, and then adjusts the functions Fx21, Fx22, Fx31, Fx32, Fx41 and Fx42 for finding the optimal pilot ratio and the optimal fuel-air ratio while keeping the clutch 5 in engagement. By this procedure, the optimal pilot ratio and the optimal fuel-air ratio can be outputted even if there is a discrepancy between the calculated steam turbine output $W_S$ and the actual steam turbine output.

Figure 2:
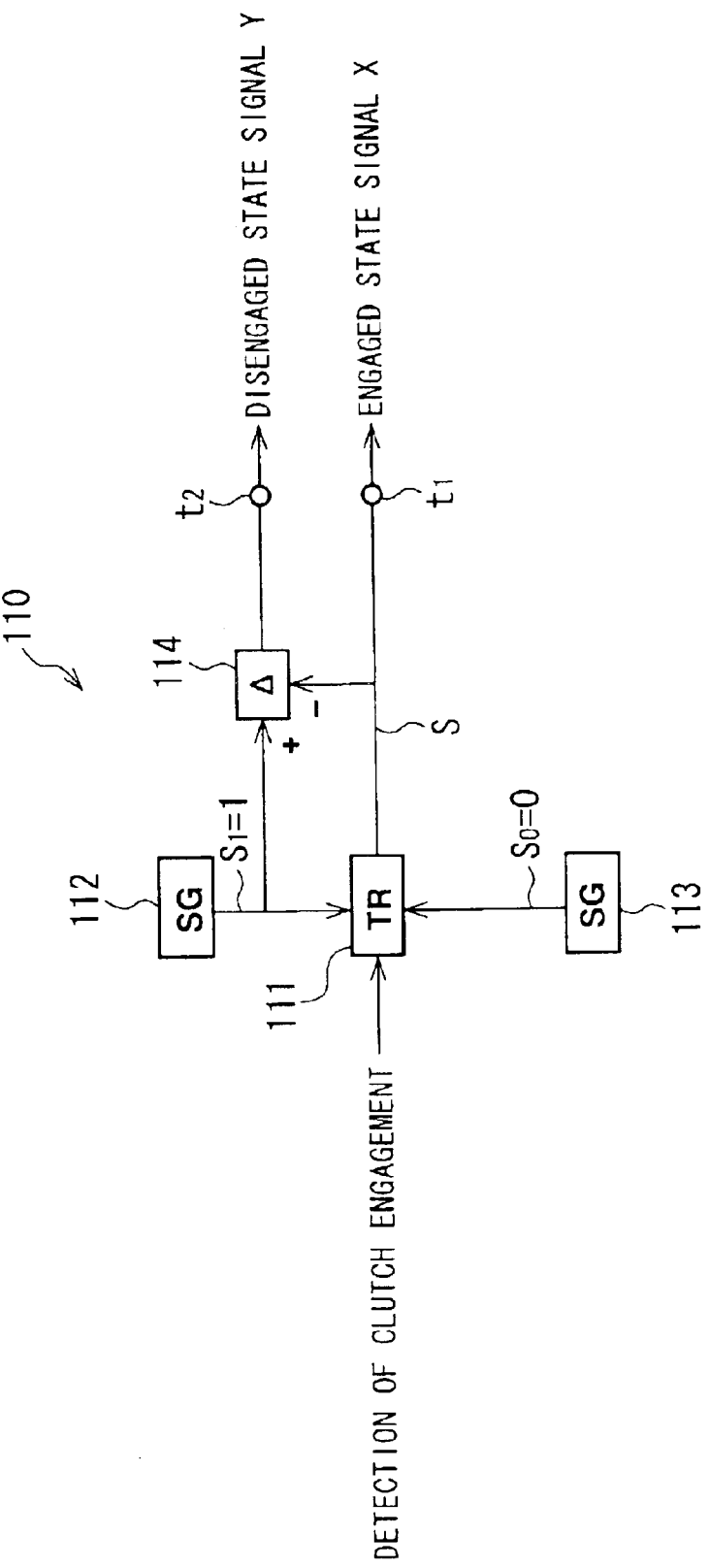
FIG. 2 is a configuration diagram showing a state signal generator.

An example of the concrete circuit construction of the state signal generator 110 will be described with reference to FIG. 2. As shown in FIG. 2, the state signal generator 110 is composed of a rating transfer machine 111, a signal generator 112 for generating a signal $S_1$ of a value 1, a signal generator 113 for generating a signal $S_0$ of a value 0, and a deviation computing machine 114. The rating transfer machine 111 outputs a signal S obtained by multiplying the signal $S_1$ and the signal $S_0$ by predetermined rates and adding the products.

When the engagement of the clutch is detected, the rating transfer machine 111 increases the rate of the signal $S_1$ gradually from 0 to 1 and decreases the rate of the signal $S_0$ gradually from 1 to 0, over a predetermined transitional period (time) starting at the time of detection of clutch engagement, to find the signal S, and outputs the signal S. After the predetermined transitional period (time) elapses, the rating transfer machine 111 sets the rate of the signal $S_1$ at 1 and sets the rate of the signal $S_0$ at 0, and outputs the signal S.

When the disengagement of the clutch is detected, the rating transfer machine 111 decreases the rate of the signals $S_1$ gradually from 1 to 0 and increases the rate of the signals $S_0$ gradually from 0 to 1, over a predetermined transitional period (time) starting at the time of detection of clutch disengagement, to find the signal S, and outputs the signal S.

After the predetermined transitional period (time) elapses, the rating transfer machine 111 sets the rate of the signal $S_1$ at 0 and sets the rate of the signal $S_0$ at 1, and outputs the signal S.

The deviation computing machine 114 subtracts the signal S from the signal $S_1$. Thus, the engaged state signal X is issued from an output terminal $t_1$, while the disengaged stage signal Y is issued from an output terminal $t_2$.

While the present invention has been described in the foregoing fashion, it is to be understood that the invention is not limited thereby, but may be varied in many other ways. Such variations are not to be regarded as a departure from the spirit and scope of the invention, and all such modifications as would be obvious to one skilled in the art are intended to be included within the scope of the appended claims.

What is claimed is:

1. An operation control apparatus for application to a single-shaft combined plant, said single-shaft combined plant comprising a gas turbine, a power generator, and a steam turbine connected together by a single shaft, and a clutch provided on said shaft for connecting said gas turbine and said power generator to said steam turbine and disconnecting said gas turbine and said power generator from said steam turbine, said steam turbine being supplied with steam from an exhaust gas boiler for generating steam by use of an exhaust gas from said gas turbine, said operation control apparatus being adapted to find an inlet guide vane opening command for controlling an opening of an inlet guide vane provided in a compressor of said gas turbine and control the opening of said inlet guide vane; to find a burner bypass valve opening command for controlling an opening of a burner bypass valve provided in a burner of said gas turbine and control the opening of said burner bypass valve; and to find a pilot ratio, a ratio between a main fuel and a pilot fuel fed to said burner, and control openings of a main fuel flow control valve and a pilot fuel flow control valve in accordance with said pilot ratio, said operation control apparatus comprising:

a computing facility unit for converting a steam pressure of steam flowing into said steam turbine into a steam turbine output; subtracting said steam turbine output from a power generator output of said power generator to find a gas turbine output; and finding a fuel flow rate command of a value corresponding to a deviation of said power generator output from a target power generator output;

a state signal generator for outputting an engaged state signal when said clutch is engaged; outputting a disengaged state signal when said clutch is disengaged; increasing a value of said engaged state signal gradually and also decreasing a value of said disengaged state signal gradually to zero in a predetermined transitional period starting at a time of engagement when said clutch in disengagement is engaged; and decreasing the value of said engaged state signal gradually to zero and also increasing the value of said disengaged state signal gradually in a predetermined transitional period starting at a time of disengagement when said clutch in engagement is disengaged;

an inlet guide vane opening command computing facility unit which has a first inlet guide vane opening command computing function capable of finding an optimal inlet guide vane opening command from said gas turbine output in an engaged state of said clutch, and a second inlet guide vane opening command computing function capable of finding an optimal inlet guide vane opening command from said gas turbine output in a disengaged state of said clutch; and which combines said inlet guide vane opening commands, found by said first and second inlet guide vane opening command computing functions, at rates corresponding to the values of said engaged state signal and said disengaged state signal to compute a final inlet guide vane opening command;

a burner bypass valve opening command computing facility unit which has a first burner bypass valve opening command computing function capable of finding an optimal burner bypass valve opening command from said gas turbine output in the engaged state of said clutch, and a second burner bypass valve opening command computing function capable of finding an optimal burner bypass valve opening command from said gas turbine output in the disengaged state of said clutch; and which combines said burner bypass valve opening commands, found by said first and second burner bypass valve opening command computing functions, at rates corresponding to the values of said engaged state signal and said disengaged state signal to compute a final burner bypass valve opening command; and a pilot ratio computing facility unit which has a first pilot ratio computing function capable of finding an optimal pilot ratio from said fuel flow rate command in the engaged state of said clutch, and a second pilot ratio computing function capable of finding an optimal pilot ratio from said fuel flow rate command in the disengaged state of said clutch; and which combines said pilot ratios, found by said first and second pilot ratio computing functions, at rates corresponding to the values of said engaged state signal and said disengaged state signal to compute a final pilot ratio.

2. An operation control method for application to a single-shaft combined plant, said single-shaft combined plant comprising a gas turbine, a power generator, and a steam turbine connected together by a single shaft, and a clutch provided on said shaft for connecting said gas turbine and said power generator to said steam turbine and disconnecting said gas turbine and said power generator from said steam turbine, said steam turbine being supplied with steam from an exhaust gas boiler for generating steam by use of an exhaust gas from said gas turbine, said operation control method being adapted to find an inlet guide vane opening command for controlling an opening of an inlet guide vane provided in a compressor of said gas turbine and control the opening of said inlet guide vane; to find a burner bypass valve opening command for controlling an opening of a burner bypass valve provided in a burner of said gas turbine and control the opening of said burner bypass valve; and to find a pilot ratio, a ratio between a main fuel and a pilot fuel fed to said burner, and control openings of a main fuel flow control valve and a pilot fuel flow control valve in accordance with said pilot ratio, said operation control method comprising:

converting a steam pressure of steam flowing into said steam turbine into a steam turbine output; subtracting said steam turbine output from a power generator output of said power generator to find a gas turbine output; and finding a fuel flow rate command of a value corresponding to a deviation of said power generator output from a target power generator output;

outputting an engaged state signal when said clutch is engaged; outputting a disengaged state signal when said clutch is disengaged; increasing a value of said engaged state signal gradually and also decreasing a value of said disengaged state signal gradually to zero in a predetermined transitional period starting at a time of engagement when said clutch in disengagement is engaged; and decreasing the value of said engaged state signal gradually to zero and also increasing the value of said disengaged state signal gradually in a predetermined transitional period starting at a time of disengagement when said clutch in engagement is disengaged;

using a first inlet guide vane opening command computing function capable of finding an optimal inlet guide vane opening command from said gas turbine output in an engaged state of said clutch, and a second inlet guide vane opening command computing function capable of finding an optimal inlet guide vane opening command from said gas turbine output in a disengaged state of said clutch; and combining said inlet guide vane opening commands, found by said first and second inlet guide vane opening command computing functions, at rates corresponding to the values of said engaged state signal and said disengaged state signal to produce a final inlet guide vane opening command;

using a first burner bypass valve opening command computing function capable of finding an optimal burner bypass valve opening command from said gas turbine output in the engaged state of said clutch, and a second burner bypass valve opening command computing function capable of finding an optimal burner bypass valve opening command from said gas turbine output in the disengaged state of said clutch; and combining said burner bypass valve opening commands, found by said first and second burner bypass valve opening command computing functions, at rates corresponding to the values of said engaged state signal and said disengaged state signal to produce a final burner bypass valve opening command; and using a first pilot ratio computing function capable of finding an optimal pilot ratio from said fuel flow rate command in the engaged state of said clutch, and a second pilot ratio computing function capable of finding an optimal pilot ratio from said fuel flow rate command in the disengaged state of said clutch; and combining said pilot ratios, found by said first and second pilot ratio computing functions, at rates corresponding to the values of said engaged state signal and said disengaged state signal to produce a final pilot ratio.

* * * * *